(No Model.)
F. A. ASSMANN.
CAN FOR OIL, &c.
No. 273,794. Patented Mar. 13, 1883.
Fig. 1.
Fig. 2. Fig. 4.
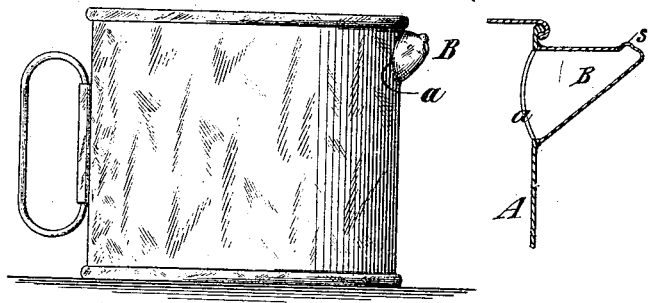 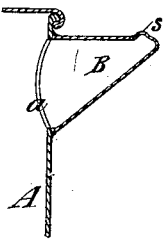
Fig. 3.
Witnesses:—
James R. Bowen.
Alfred L. Brown
Inventor:—
Franz A. Assmann
by his attorney
Edwin H. Brown
N. PETERS, Photo-Lithographer, Washington, D. C.

UNITED STATES PATENT OFFICE.

FRANZ A. ASSMANN, OF NEW YORK, N. Y., ASSIGNOR OF ONE-HALF TO JOHN H. SEHEEL, OF SAME PLACE.

CAN FOR OIL, &c.

SPECIFICATION forming part of Letters Patent No. 273,794, dated March 13, 1883.

Application filed December 18, 1882. (No model.)

*To all whom it may concern:*

Be it known that I, FRANZ A. ASSMANN, of New York, in the county and State of New York, have invented a certain new and useful Improvement in Cans for Oil and other Liquids, of which the following is a specification.

The object of my improvement is to provide for a can a spout out of which the contents may be conveniently poured, and which shall be inexpensive and will not occupy much space.

The improvement consists in the combination, with a cylindric can, of a pouring-spout arranged upon its circumference, made of such material that it may be readily cut with a knife, and of such size that it may be accommodated within the space which will be left when the can is packed side by side with other cans. This pouring-spout is preferably made tapering, so that it may be cut to form a large or a small opening; and the can preferably has a top or top portion made of material so soft that it may be cut with a knife to produce a vent.

In the accompanying drawings, Figure 1 is a plan of a number of cans made in accordance with my invention and packed side by side. Fig. 2 is a side view, upon a larger scale, of a can embodying my invention. Fig. 3 is a perspective view of the pouring-spout of the can, and Fig. 4 is a vertical section of a portion of the can and its attached pouring-spout.

Similar letters of reference designate corresponding parts in all the figures.

A designates a can of cylindric shape, made of sheet metal in the ordinary or any other approved manner. It is provided with a pouring-spout, B, which extends from its circumference, and is made of sheet metal so thin and soft that it may be easily cut with a knife. This spout may be made integral with the body of the can, and may be drawn up therefrom, as it will then be sufficiently soft and thin to subserve the desired ends; but it may be found preferable to make it of a separate piece of metal softer and thinner than that of which the can-body is made. In that case an opening, *a*, will be made in the body of the can, and the pouring-spout will be attached, by solder or otherwise, outside this opening, as shown in Fig. 4. The pouring-spout is preferably made tapering. Hence by cutting more or less from its outer end a larger or smaller opening may be made in it. The pouring-spout may have upon it a bulbous projection, *s*, which may afford a hold for the knife in cutting off the spout. The top or head of the can is soft, or has a soft portion, which may be readily cut with a knife to form a vent when it is desired to pour out the contents of the can. The entire top or head may be made of soft sheet metal, so that an incision can be easily made with a knife; or it may be provided with a hole, *b*, covered with soft metal or solder, which can be easily cut.

It will be seen by reference to Fig. 1 that the pouring-spouts B of a number of the cans packed together will occupy the space between the cylindric bodies of the cans.

What I claim as my invention, and desire to secure by Letters Patent, is—

1. The combination, with a cylindric can, of a pouring-spout arranged upon its circumference, made of such material that it may be readily cut with a knife, and of such size that it may be accommodated within the space which will be left when the can is packed side by side with other cans, substantially as specified.

2. The combination, with a cylindric can, of a tapering pouring-spout arranged upon its circumference, made of such material that it may be readily cut with a knife to form a large or small opening, and of such size that it may be accommodated within the space which is left when the can is packed side by side with other cans, substantially as specified.

3. The combination, with a cylindric can having a top or top portion which is made sufficiently thin and soft to enable it to be cut to produce a vent, of a pouring-spout arranged upon its circumference, made of such material that it may be readily cut with a knife, and of such size that it may be accommodated within the space which is left when the can is packed side by side with other cans, substantially as specified.

FRANZ A. ASSMANN.

Witnesses:
T. J. KEANE,
JAMES R. BOWEN.